June 3, 1924.  
F. MÜLLER  
1,496,355  
INDEXING MECHANISM FOR AUTOMATIC MACHINES  
Filed Dec. 31, 1921  2 Sheets-Sheet 1
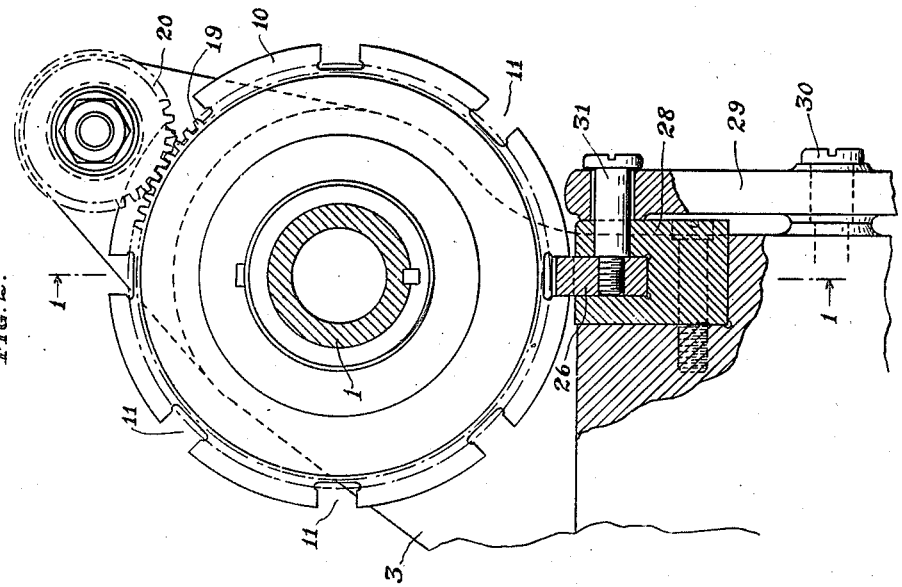
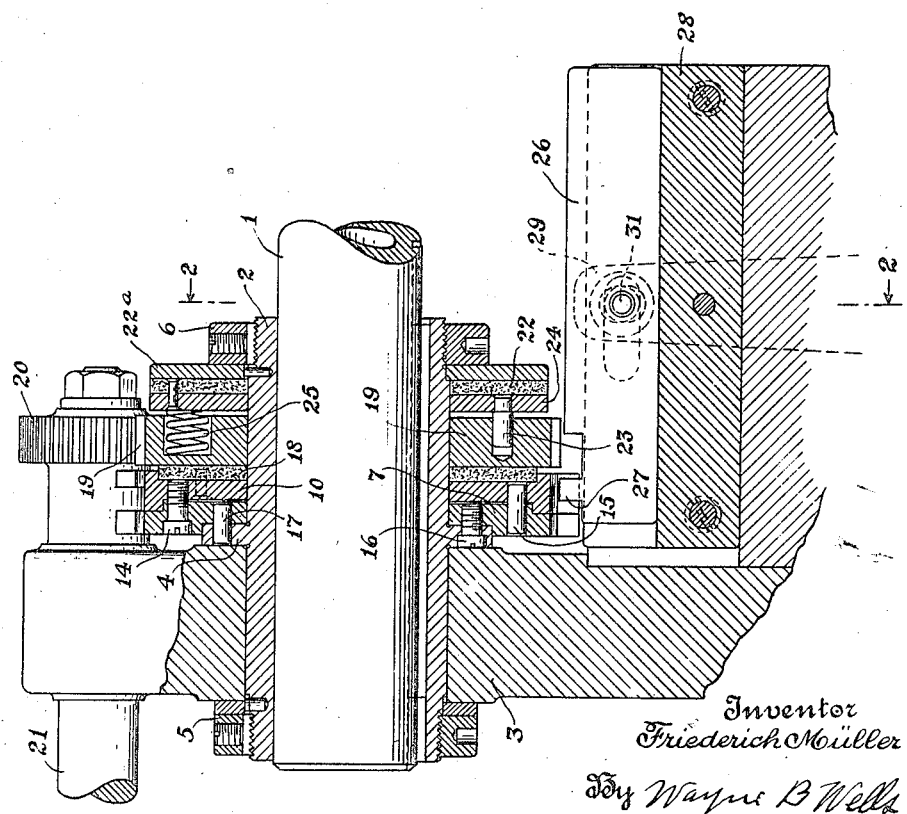
Inventor  
Friederich Müller  
By Wayne B Wells  
Attorney June 3, 1924.  1,496,355
F. MÜLLER
INDEXING MECHANISM FOR AUTOMATIC MACHINES
Filed Dec. 31, 1921  2 Sheets-Sheet 2
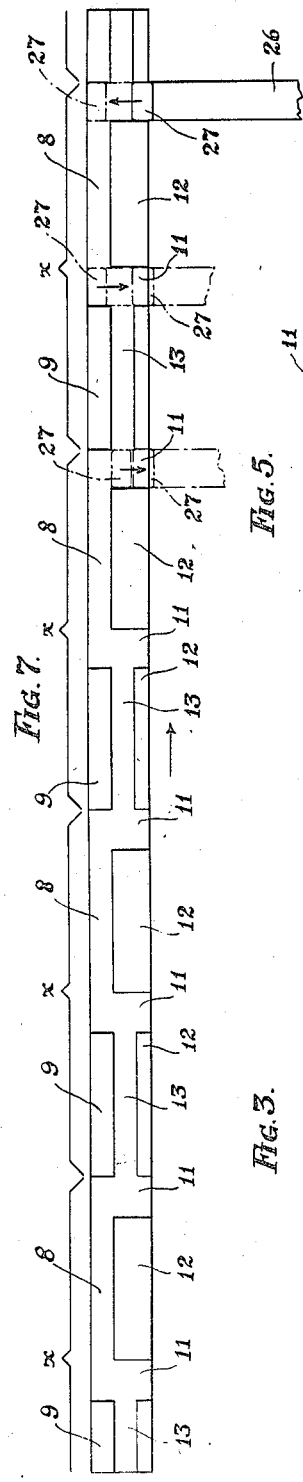
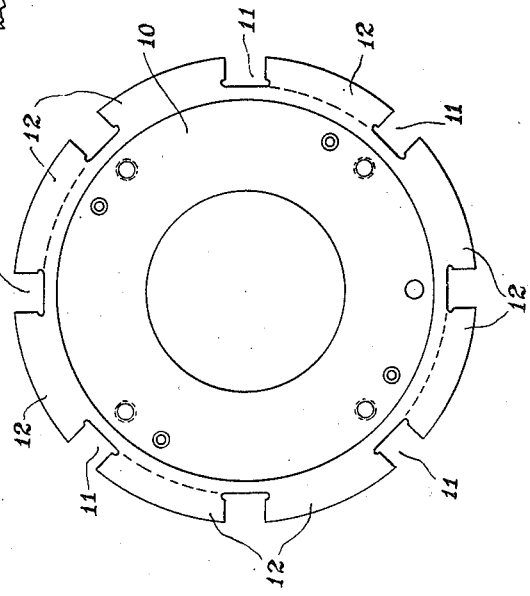
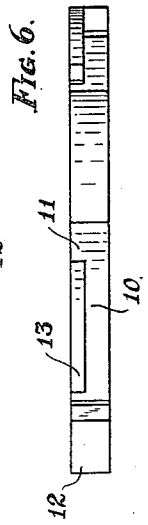
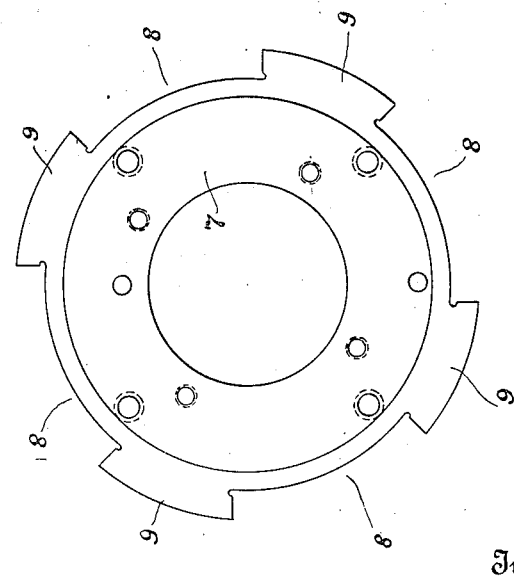
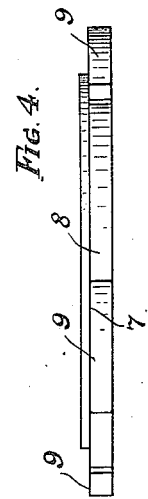
Inventor
Friederich Müller
By Wayne B Wells
Attorney.

Patented June 3, 1924.

1,496,355

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

INDEXING MECHANISM FOR AUTOMATIC MACHINES.

Application filed December 31, 1921. Serial No. 526,122.

*To all whom it may concern:*

Be it known that I, FRIEDERICH MÜLLER, a citizen of the United States, residing at Hartford, in the county of Hartford and State of Connecticut, have invented certain new and useful Improvements in Indexing Mechanisms for Automatic Machines, of which the following is a specification.

This invention relates to an indexing mechanism and in particular to an indexing mechanism adapted to be applied to an automatic milling or other form of machine.

The primary object of the invention is to provide an improved mechanism of this type adapted to perform an indexing operation on a rotatable member at each reciprocation in both directions of a reciprocatory member cooperating with the indexing mechanism, and to securely lock the mechanism against movement after the indexing operation has been completed.

More specifically, it is an object of the invention to provide an improved indexing mechanism including a rotating member having a series of abutments and a reciprocatory member cooperating therewith, the construction being such that the reciprocatory member upon entering certain spaces between the abutments in the rotating member permits rotation of the indexing mechanism through a portion of a revolution, such rotation being limited by the said abutments on the rotating member engaging against the reciprocatory member.

The particular embodiment of the invention illustrated in the drawings is adapted to index a milling cutter to a plurality of different operative positions equally spaced about an axis so that the axis of the cutter is moved about in a small circle a quarter, or other fraction of a turn, at each indexing operation.

With the above and other objects in view, my invention consists in the features of construction and operation set forth in the following specification and illustrated in the accompanying drawings. In such drawings annexed hereto and forming a part of this specification, I have shown but one embodiment of my invention. It will be understood, however, that the invention can be otherwise embodied and that the drawings are not to be construed as defining or limiting the scope of the invention, the claims appended to this specification being relied upon for that purpose.

In the annexed drawings, I have shown the milling cutter indexing mechanism only of a combined automatic metal cutting machine comprising the subject matter of my copending application, Serial No. 526,121 filed December 31, 1921. Reference to such application may be made for details of the machine other than the indexing mechanism broadly.

Referring to the figures of the drawings:

Figure 1 is a fragmentary longitudinal sectional view of that portion of my above-mentioned machine showing my improved indexing mechanism.

Fig. 2 is a cross section thereof on line 2—2 of Fig. 1.

Fig. 3 is a face view of one of the notched plates used in the indexing mechanism.

Fig. 4 is an edge view thereof.

Fig. 5 is a face view of the other notched plate adapted to cooperate with the plate shown in Fig. 3.

Fig. 6 is an edge view thereof.

Fig. 7 is a development of the peripheries of the notched plates shown in Figs. 3 and 5 as they appear when secured together.

In its broadest aspect the present invention comprises the following principal parts: first, a rotatable member adapted to be indexed a portion of a revolution at each index movement; second, rotating means for said rotatable member; third, a member on said rotatable member having a plurality of spaced abutments to limit the rotative movement of the member; fourth, a reciprocatory member adapted to be reciprocated in accordance with the required index movements of the rotatable member; and fifth, means to lock the rotatable member at each indexed position.

Referring more specifically to the drawings by reference characters, 1 indicates a hollow shaft which is required to be indexed. This shaft is keyed within a bushing 2 rotatably supported in the machine frame 3. The bushing 2 is held in the frame 3 between a flange 4 formed integrally on the bushing and a nut 5 threaded on to the end of the bushing at the opposite side of the frame. The several parts of the indexing mechanism are carried by the bushing 2 between the flange 4 thereon and a nut 6 threaded to the forward end of the bushing 2. These parts will now be described.

A disk or plate 7 shown in detail in Fig. 3 is provided with four equi-spaced peripheral notches 8 providing four equi-spaced projections or abutments 9 therebetween. The plate 10 shown in Figs. 2 and 5 is provided with eight equi-spaced notches 11 providing eight equi-spaced projections or abutments 12 therebetween. One side of every alternate projection 12 is cut away at 13 for a purpose presently to appear. In the operative position, these two plates are assembled concentrically together upon the hollow shaft 1 and secured together by screws 14 and pins 15. When thus assembled, the combined peripheries thereof appear when developed as shown in Fig. 7 wherein the periphery is divided into four symmetrical quarters, each of these quarters being indicated at X.

The combined plates 7 and 10 just described are mounted on the bushing 2 adjacent the flange 4 and are secured thereto by means of screws 16 and pins 17 in the flange 4 and plate 7. It will be seen from this construction that plates 7 and 10 provide abutments engaged by an adjacently mounted reciprocatory member to limit the rotative movement of the bushing 2 at each index movement. This will presently be more fully described. The plate 10 has a depression in its front face within which is riveted a friction pad 18. A gear 19, loosely mounted on the bushing 2 and bearing against the pad 18, is driven by a gear 20 on a shaft 21. A friction pad plate 22 is secured adjacent the front face of gear 19 to a plate 24 preferably by being riveted thereto as shown. The plate 24 is flexibly pinned to the bushing 2 between the friction pad 22 and a flange 22ª adjacent nut 6 by means of pins one of which is shown at 23. Springs 25 retained within the gear 19 normally hold the friction pads 18 and 22 in frictional driving contact with parts fastened to the rotating shaft 1 whereby the bushing 2 is driven from the gear 19. In operation, therefore, gear 20 is constantly rotated in one direction thus rotating gear 19 and constantly urging the bushing 2 and the hollow shaft 1 to rotate in the same direction as gear 19.

A reciprocating slide 26 provided with a lug or finger 27 thereon is mounted for longitudinal movement in a block 28 bolted to the frame 3. A lever 29 pivoted at 30 has one end secured to the slide at 31 whereby the slide 26 is reciprocated as the lever 29 is oscillated. As illustrated in detail in my afore-mentioned application, this lever 29 is properly oscillated by a cam in timed sequence for operating the indexing mechanism.

The main object of the invention, as stated above, is to provide an improved indexing mechanism which will operate to properly index the hollow shaft 1 a portion of a revolution at each reciprocating movement of the slide 26 in both directions. As illustrated in the drawings, the plates 7 and 10 are formed in a manner to index the shaft 1 a quarter turn at each complete movement of the slide 26. It will, however, be understood that the shaft 1 may be given any rotative indexing movement desired, it being only necessary to substitute other plates provided with the proper number of equally spaced notches and abutments for the plates 7 and 10.

The operation of the mechanism is as follows: The gear 19 is constantly rotated in the direction of the arrow shown in Fig. 7. Normally and while in operative position, the lug 27 is in the position shown in Fig. 7 in full lines within one of the notches 11, whereby the plate 10 and elements secured thereto are locked against rotation. When the lever 29 operates to move the slide 26 rearwardly, that is, to the left as seen in Fig. 1, the lug 27 rides beyond the abutment 12 into a groove 8 on plate 7 whereupon the plates and indexing mechanism are free to rotate with the gear 19 until one end of the abutment 9 strikes against the lug 27. Further rotation of the mechanism is thereby arrested until the slide 26 in its return movement, that is to the right, as seen in Fig. 1 moves the lug 27 beyond the abutment 9 and into alignment with the groove 13 formed by the cutaway portions of abutments 12. The plates are thereupon again permitted to rotate until the next abutment 12 strikes the lug 27. The slide now completes its return movement, which places the lug 27 within the notch 11 and secures the mechanism against further movement until the next indexing operation. It will be noted that the slide 26 has made one complete reciprocation and that the shaft 1 has been indexed a quarter turn in two steps of one-eighth revolution each.

The four peripheral portions $x$ of the plates 7 and 10 shown in developed form in Fig. 7 are the same as the one which has just been described as being traversed by the lug 27, as is also the operation of the mechanism therewith. The mechanism is therefore in like manner indexed successively a quarter turn at each complete reciprocation of the slide 26.

What I claim is:

1. An indexing mechanism comprising the combination of an element to be rotatably indexed, a rotary driving element, a driving connection between the two elements, and a cooperating reciprocatory member operative on the mechanism for controlling the indexing operation, the construction being such that the first element is given the required indexing movement in two periods respectively upon reciprocation of the said member in opposite directions.

2. An indexing mechanism comprising the combination of an element to be rotatably indexed, a cooperating rotary driving element coaxial therewith, a driving connection between the two elements, and a cooperating reciprocatory member operative on the periphery of certain members of the indexing mechanism for controlling the indexing operation, the construction being such that the first element is given the required indexing movement only upon reciprocation of the said member in opposite directions.

3. An indexing mechanism comprising the combination of an element to be rotatably indexed, a rotary driving element, a driving connection between the two elements, means connected to the first element and provided with a series of grooves and abutments thereon, and a cooperating reciprocatory member provided with a lug thereon for riding in the grooves and engaging against the abutments, the construction being such that, upon reciprocation of the said member, the said lug rides within certain of the grooves to permit rotation of the said means and is engaged by abutments at the ends of the grooves to limit the indexing movement thereof.

4. An indexing mechanism comprising the combination of an element to be rotatably indexed, a rotary driving element, a driving connection between two elements, means connected to the first element and provided with a series of grooves and abutments on the periphery thereof, and a cooperating reciprocatory member provided with a lug thereon for riding in the grooves and engaging against the abutments, the construction being such that, upon reciprocation of the said member, the said lug rides within certain of the grooves to permit rotation of the said means and is engaged by abutments at the ends of the grooves to limit the indexing movement thereof.

5. An indexing mechanism comprising the combination of an element to be rotatably indexed, a rotary driving element, a frictional connection between the two elements, means connected to the first element and provided with a series of grooves and abutments thereon, and a cooperating reciprocatory member provided with a lug thereon for riding in the grooves and engaging against the abutments, the construction being such that in the normal idle position of the reciprocatory member the lug thereon is engaged between adjacent abutments to lock the indexed element against rotation, and upon reciprocation of the said member, the said lug rides from such locking position to within certain of the grooves to permit rotation of the said means and is engaged by abutments at the ends of the grooves to limit the indexing movement thereof.

6. An indexing mechanism comprising the combination of an element to be rotatably indexed, a rotary driving element, a driving connection between the two elements, two plates secured together and to the first element and having their peripheries notched to provide a series of grooves and abutments thereon, and a cooperating reciprocatory member provided with a lug thereon for riding in the grooves and engaging against the abutments, the construction being such that, upon reciprocation of the said member, the said lug rides within certain of the grooves to permit rotation of the said means and is engaged by abutments at the ends of the grooves to limit the indexing movement thereof.

7. An indexing mechanism comprising the combination of an element to be rotatably indexed, a rotary driving element, a driving connection between the two elements, means connected to the first element and provided with a series of grooves and abutments thereon, and a cooperating reciprocatory member provided with a lug thereon for riding in the grooves and engaging against the abutments, the construction being such that, upon reciprocation of the said member, the said lug rides within certain of the grooves to permit rotation of the said means and is engaged by abutments at the ends of the grooves to limit the indexing movement thereof, and the said means and indexed element receiving the full indexing movement only upon reciprocation of the member in both directions.

8. An indexing mechanism comprising the combination of an element to be rotatably indexed, a cooperating rotary driving element coaxial therewith, a driving connection between the two elements, and a cooperating reciprocatory member operative on the periphery of certain of the indexing mechanism for controlling the indexing operation, the construction being such that normally the reciprocatory member in its idle position locks the indexed element against rotation and the mechanism operates in the following sequence upon reciprocation of the member, forward movement of the reciprocatory member first unlocks the mechanism and thereafter permits a limited rotary indexing thereof and the return movement of the member permits the completion of the indexing operation and thereafter locks the mechanism against rotation.

9. An indexing mechanism comprising the combination of an element to be rotatably indexed, a rotary driving element, a driving connection between the two elements, means connected to the first element and provided with a series of grooves and abutments thereon, and a cooperating reciprocatory member provided with a lug thereon for riding in the grooves and engaging against the abutments, the construction being such that in the normal idle position of the reciprocatory member the lug thereon is engaged between two abutments to lock the indexed element against rotation, and the mechanism operates in the following sequence upon reciprocation of the member, forward movement of the reciprocatory member moves the lug from engagement with the abutments and into certain of the grooves to permit a rotary indexing of the mechanism until another abutment strikes the lug, and the return movement of the member moves the lug from the last mentioned abutment into another groove whereupon the mechanism is permitted a further indexing movement until another abutment strikes the lug, the member thereafter finishing its return movement and moving the lug into a locking position between two abutments.

10. An indexing mechanism comprising in combination, a rotatable element to be indexed, means to rotate said member, means mounted on said rotatable member providing a plurality of staggered abutments, and a reciprocatory member adjacent said abutments whereby reciprocatory movements of said latter member causes it to successively engage said abutments and prevent further rotation of said rotatable member until said reciprocatory member moves from engagement with an abutment.

11. An indexing mechanism comprising in combination, a rotatable element to be indexed, means to rotate said member, means mounted on said rotatable member providing a plurality of staggered abutments, a reciprocatory member adjacent said abutments whereby reciprocatory movements of said latter member causes it to successively engage said abutments and prevent further rotation of said rotatable member until said reciprocatory member moves from engagement with an abutment, and means to lock said rotatable member in each indexed position.

12. An indexing mechanism comprising in combination, a rotatable element to be indexed, means to rotate said member, a pair of plates mounted on said rotatable member having a plurality of staggered abutments thereon, and a reciprocatory member adjacent said abutments whereby reciprocatory movements of said latter member causes it to successively engage said abutments and prevent further rotation of said rotatable member until said reciprocatory member moves from engagement with an abutment.

13. An indexing mechanism comprising in combination, a rotatable element to be indexed, means to rotate said member, a pair of plates mounted on said rotatable member having a plurality of staggered abutments thereon, and a reciprocatory member adjacent said abutments whereby reciprocatory movements of said latter member will permit rotation of said rotatable member and successively engage said abutments with said reciprocatory member and prevent further rotation of said rotatable member until said reciprocatory member moves from engagement with an abutment.

14. An indexing mechanism comprising in combination, a rotatable element to be indexed, means to rotate said member, means mounted on said rotatable member providing a plurality of spaced abutments, a reciprocatory member adjacent said member and adapted to successively engage said abutments, and means to reciprocate said latter member in accordance with the required index movement of said rotatable member whereby said rotatable member is permitted to rotate a fraction of a revolution at each reciprocation of said reciprocatory member.

15. An indexing mechanism comprising in combination, a rotatable element to be indexed, means to rotate said member, means mounted on said rotatable member providing a plurality of spaced abutments, a reciprocatory member adjacent said member and adapted to successively engage said abutments, means to reciprocate said latter member in accordance with the required index movements of said rotatable member whereby said rotatable member is permitted to rotate a fraction of a revolution at each reciprocation of said reciprocatory member, and means to lock said rotatable member in indexed position and while said reciprocatory member is at one end of its movement.

16. An indexing mechanism comprising in combination, a rotatable element to be indexed, means to rotate said member, a pair of plates on said rotatable member having a plurality of spaced abutments on their peripheries, a reciprocatory member adjacent said member and adapted to successively engage said abutments, means to reciprocate said reciprocatory member in accordance with the required index movements of said rotatable member whereby said rotatable member is permitted to rotate a fraction of a revolution at each reciprocation of said reciprocatory member, and abutments adjacent said above mentioned abutments forming locking members for said rotatable member.

17. In an indexing mechanism, the combination with a rotatable member, notched plates mounted on said member, a source of power, and a yieldable clutch mechanism for connecting said plates to the source of power, of a latch member for controlling said plates to effect indexing of the rotatable member.

18. In an indexing mechanism, the combination with a rotatable member, two notched plates fixedly mounted on said member, a source of power, and a yieldable clutch mechanism for connecting said plates to the source of power, of a latch member for controlling said plates to effect indexing of the rotatable member.

19. In an indexing mechanism, the combination with a rotatable sleeve mechanism, two notched plates mounted on said sleeve mechanism, a constantly rotating gear wheel mounted on said sleeve and a friction clutch mechanism for connecting said gear wheel to the notched plates, of a latch member having a projecting portion adapted to enter the notches in said plate to control the indexing of the sleeve mechanism, and means for controlling said latch member.

In testimony whereof, I hereto affix my signature.

FRIEDERICH MÜLLER.